United States Patent
Chou et al.

(10) Patent No.: US 10,048,798 B2
(45) Date of Patent: Aug. 14, 2018

(54) TOUCH DETECTION DEVICE INCLUDING A SET OF CAPACITORS AND USED TO DETECT A TOUCH EVENT

(71) Applicant: ITE Tech. Inc., Hsinchu (TW)

(72) Inventors: Yi-Chung Chou, Taipei (TW); Tzu-An Lin, Hsinchu (TW); Yu-Chin Chen, Hsinchu (TW)

(73) Assignee: ITE Tech. Inc., Hsinchu (TW)

( * ) Notice: Subject to any disclaimer, the term of this patent is extended or adjusted under 35 U.S.C. 154(b) by 43 days.

(21) Appl. No.: 15/424,876

(22) Filed: Feb. 5, 2017

(65) Prior Publication Data
US 2017/0242528 A1   Aug. 24, 2017

(30) Foreign Application Priority Data
Feb. 19, 2016   (TW) .............................. 105104846 A

(51) Int. Cl.
G06F 3/045 (2006.01)
G06F 3/041 (2006.01)
G06F 3/044 (2006.01)

(52) U.S. Cl.
CPC ............ G06F 3/0416 (2013.01); G06F 3/044 (2013.01); G06F 3/0418 (2013.01)

(58) Field of Classification Search
CPC ....... G06F 3/0416; G06F 3/0418; G06F 3/044
See application file for complete search history.

(56) References Cited

U.S. PATENT DOCUMENTS

2008/0157782 A1   7/2008   Krah
2014/0240275 A1*  8/2014   Tun .................. G06F 3/044
                                                    345/174

FOREIGN PATENT DOCUMENTS

| TW | 201131451 A1 | 9/2011 |
| TW | 201415332 A | 4/2014 |
| TW | 201416947 A | 5/2014 |
| TW | 201501004 A | 1/2015 |
| TW | 201545029 A | 12/2015 |

* cited by examiner

*Primary Examiner* — Mark Edwards
(74) *Attorney, Agent, or Firm* — Winston Hsu

(57) ABSTRACT

A touch detection device includes a processing unit, a first capacitor and a second capacitor. The processing unit has an output terminal for outputting a first analog signal, and an input terminal for receiving a second analog signal. The first capacitor has an adjustable first capacitance. The first capacitor includes a first terminal coupled to the output terminal of the processing unit, and a second terminal coupled to the input terminal of the processing unit. The second capacitor has a second capacitance. The second capacitor includes a first terminal coupled to the input terminal of the processing unit, and a second terminal coupled to a ground terminal. The first capacitance is adjusted to be substantially equal to the second capacitance. The processing unit determines whether a touch event is triggered according to variation of voltage level of the second analog signal.

14 Claims, 10 Drawing Sheets

TOUCH DETECTION DEVICE INCLUDING A SET OF CAPACITORS AND USED TO DETECT A TOUCH EVENT

CROSS REFERENCE TO RELATED APPLICATION

This application claims priority to Taiwan Patent Application No. 105104846, filed Feb. 19, 2016, and incorporated herein by reference in its entirety.

BACKGROUND OF THE INVENTION

1. Field of the Invention

The present invention relates to a touch detection device and a touch detection method, and more particularly, a touch detection device and a touch detection method used to detect whether a touch event has been triggered according to a variation of a voltage level.

2. Description of the Prior Art

Presently, a touch detection device determines whether a touch event has been triggered by charging a capacitor with an output signal, and then receiving an input signal corresponding to the discharge from the capacitor. In order to charge and discharge the capacitor, the mentioned output signal and input signal should be digital signals such as square waves. A backend filtering process is thus difficult to be performed, and unwanted noise may not be filtered out. A signal-to-noise ratio (SNR) cannot be increased, and the touch detection sensitivity is reduced correspondingly.

SUMMARY OF THE INVENTION

An embodiment of the present invention provides a touch detection device including a processing unit, a first capacitor and a second capacitor. The processing unit includes an output terminal used to output a first analog signal, and an input terminal used to receive a second analog signal. The first capacitor has an adjustable first capacitance, and includes a first terminal coupled to the output terminal of the processing unit, and a second terminal coupled to the input terminal of the processing unit. The second capacitor has a second capacitance, and includes a first terminal coupled to the input terminal of the processing unit, and a second terminal coupled to a ground terminal. The first capacitance is adjusted to be substantially equal to the second capacitance. The processing unit determines whether a touch event has been triggered according to a variation of a voltage level of the second analog signal.

An embodiment of the present invention provides a touch detection method of a touch detection device. The touch detection device includes a processing unit, a first capacitor and a second capacitor. A first terminal of the first capacitor is coupled to an output terminal of the processing unit. A second terminal of the first capacitor is coupled to an input terminal of the processing unit and a first terminal of the second capacitor. A second terminal of the second capacitor is coupled to a ground terminal. The touch detection method includes outputting a first analog signal via the output terminal of the processing unit; receiving a second analog signal via the input terminal of the processing unit, wherein a voltage level of the second analog signal is corresponding to a voltage level of the first analog signal, a first capacitance of the first capacitor and a second capacitance of the second capacitor; comparing the voltage level of the second analog signal with the voltage level of the first analog signal by using the processing unit; and adjusting the first capacitance to substantially equalize the voltage level of the second analog signal to half the voltage level of the first analog signal when the voltage level of the second analog signal fails to be substantially equal to half the voltage level of the first analog signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
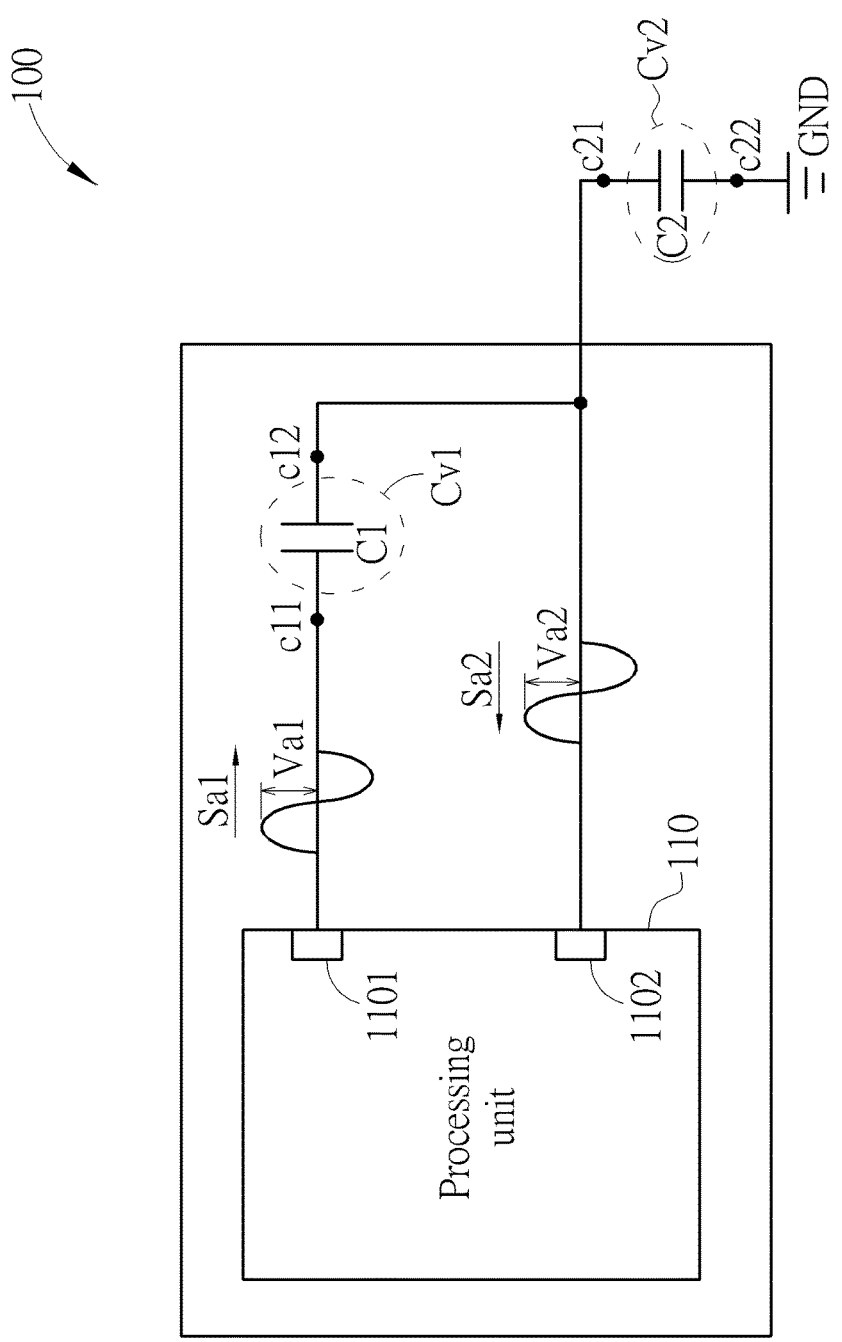
FIG. 1 illustrates a touch detection device according to an embodiment of the present invention.

FIG. 1 illustrates a touch detection device 100 according to an embodiment of the present invention. The touch detection device 100 may include a processing unit 110, a first capacitor C1 and a second capacitor C2. The processing unit 110 may include an output terminal 1101 used to output a first analog signal Sa1 (corresponding to a voltage level Va1), and an input terminal 1102 used to receive a second analog signal Sa2 (corresponding to a voltage level Va2). The first capacitor C1 may be an adjustable capacitor and have an adjustable first capacitance Cv1. The first capacitor C1 may include a first terminal c11 coupled to the output terminal 1101 of the processing unit 110, and a second terminal c12 coupled to the input terminal 1102 of the processing unit 110. The second capacitor C2 has a second capacitance Cv2, and includes a first terminal c21 coupled to the input terminal 1102 of the processing unit 110, and a second terminal c22 coupled to a ground terminal GND. The first capacitance Cv1 may be adjusted to be substantially equal to the second capacitance Cv2. The processing unit 110 may determine whether a touch event has been triggered according to a variation of the voltage level Va2 of the second analog signal Sa2. The first analog signal Sa1 and the second analog signal Sa2 may be sine waves, for example. The first capacitor C1 and the processing unit 110 may be integrated in one circuitry module such as an integrated circuit (IC). The second capacitor C2 may correspond to an equivalent capacitance from the touch panel to a ground.

Figure 2:
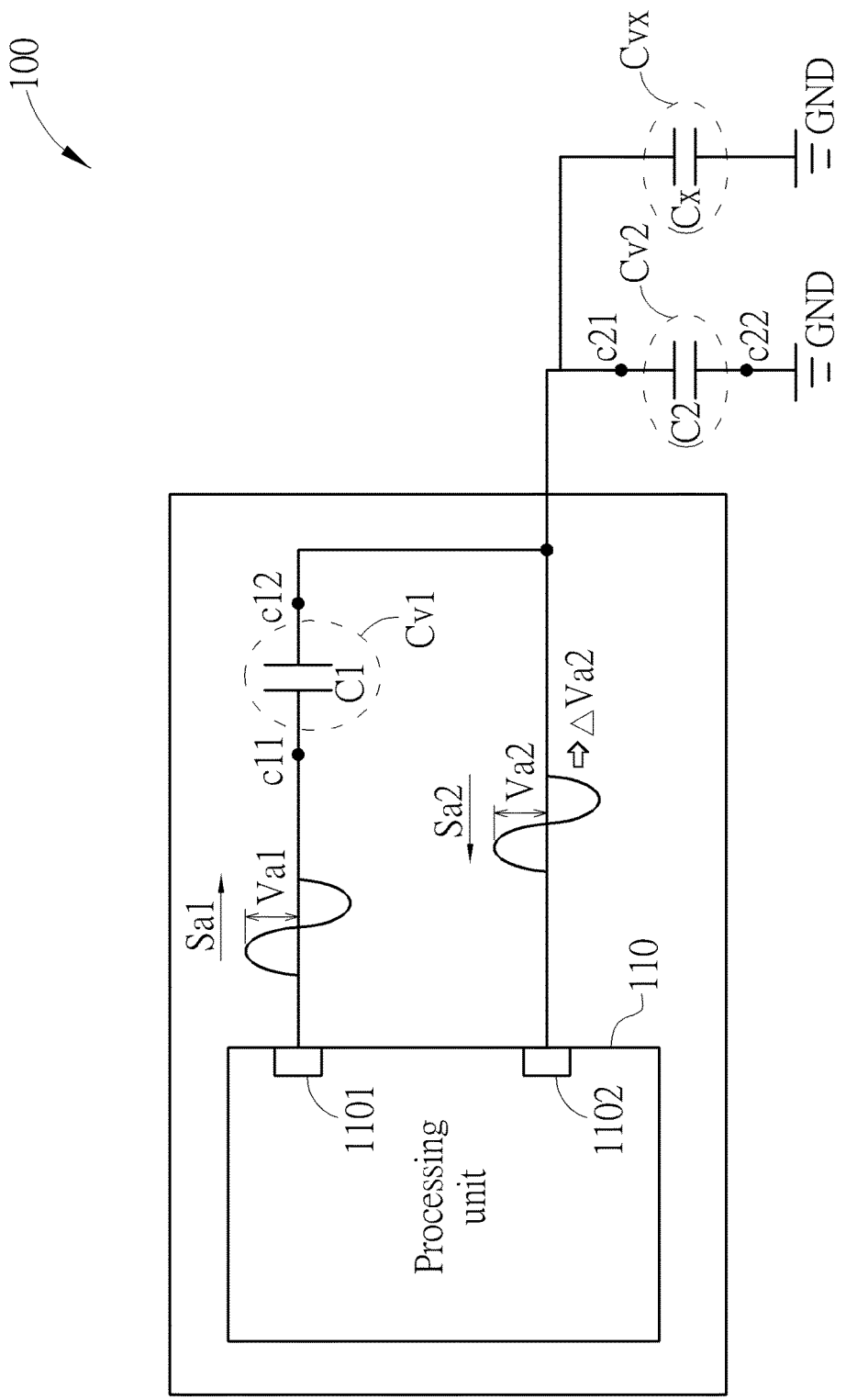
FIG. 2 illustrates that a touch event is triggered according to an embodiment of the present invention.

FIG. 2 illustrates that a touch event is triggered according to an embodiment of the present invention. The touch event may be corresponding to that an external object Cx touches the touch detection device 100. The external object Cx may have a third capacitance Cvx. The variation ΔVa2 of the voltage level Va2 of the second analog signal Sa2 may be corresponding to the first capacitance Cv1, the second capacitance Cv2, the third capacitance Cvx and the voltage level Va1 of the first analog signal Sa1. Related details are described below. The external object Cx may be (but not limited to) a finger or a stylus, for example.

Figure 3:
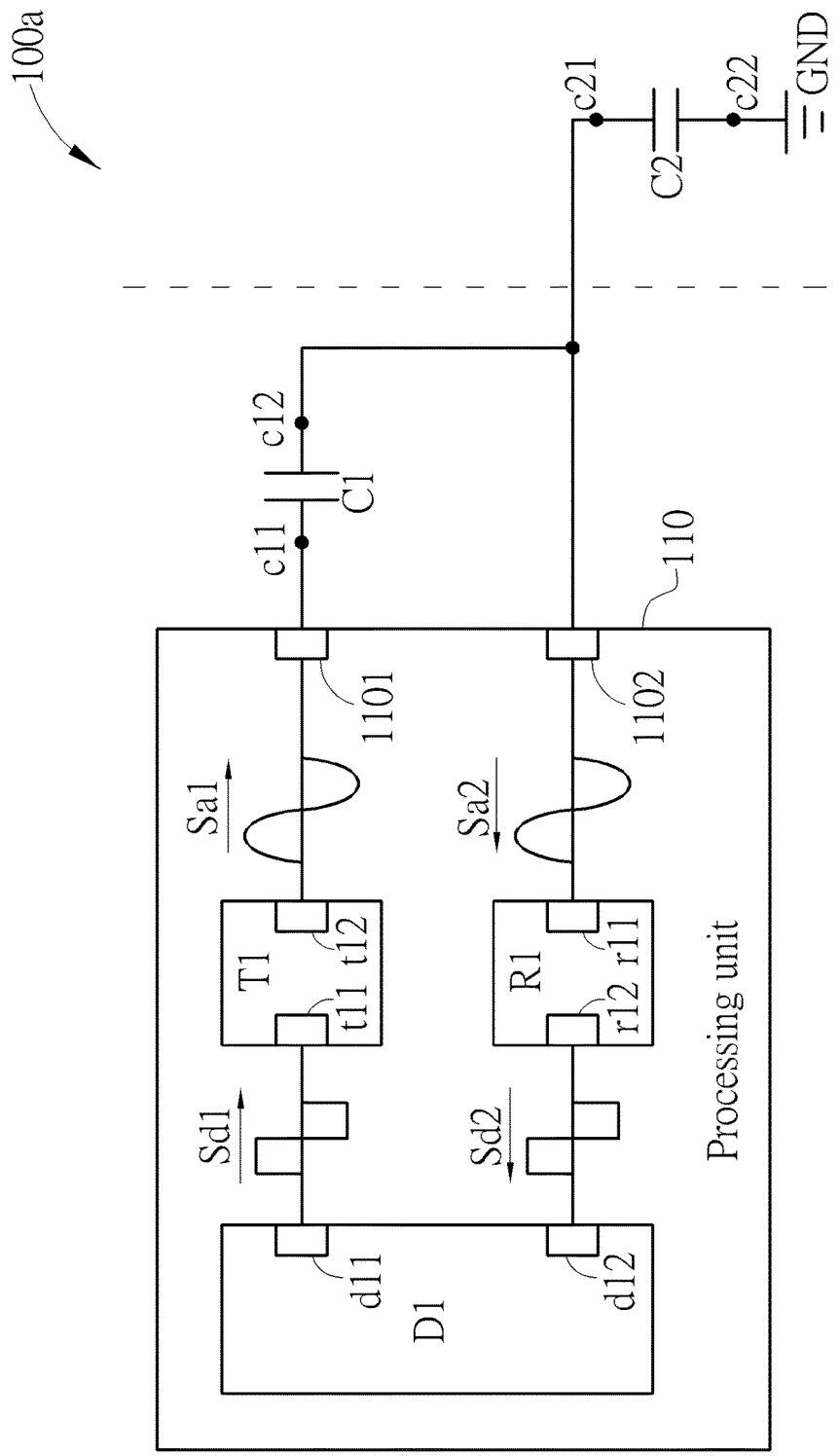
FIG. 3 illustrates a touch detection device according to an embodiment of the present invention.

FIG. 3 illustrates a touch detection device 100a according to an embodiment of the present invention. The touch detection device 100a may provide a possible structure of the touch detection device 100. As shown in FIG. 3, the processing unit 110 may further include a first conversion unit T1, a second conversion unit R1 and a digital control unit D1. The first conversion unit T1 may be used to generate the first analog signal Sa1 according to a first digital signal Sd1, and include a first terminal t11 used to receive the first digital signal Sd1, and a second terminal coupled to the output terminal 1101 of the processing unit 110 and used to output the first analog signal Sa1. The second conversion unit R1 is used to generate a second digital signal Sd2 according to a second analog signal Sa2, and includes a first terminal r11 coupled to the input terminal 1102 of the processing unit 110 and used to receive the second analog signal Sa2, and a second terminal r12 used to output the second digital terminal Sd2. The digital control unit D1 may be a digital circuit module used to generate the first digital signal Sd1, receive the second digital signal Sd2, and determine whether a touch event has been triggered according to the first digital signal Sd1 and the second digital signal Sd2. The digital control unit D1 may include an output terminal d11 and an output terminal d12. The output terminal d11 may be coupled to the first terminal t11 of the first conversion unit T1 and used to output the first digital signal Sd11. The input terminal d12 may be coupled to the second terminal r12 of the second conversion unit R1 and used to receive the second digital signal Sd2.

Figure 4:
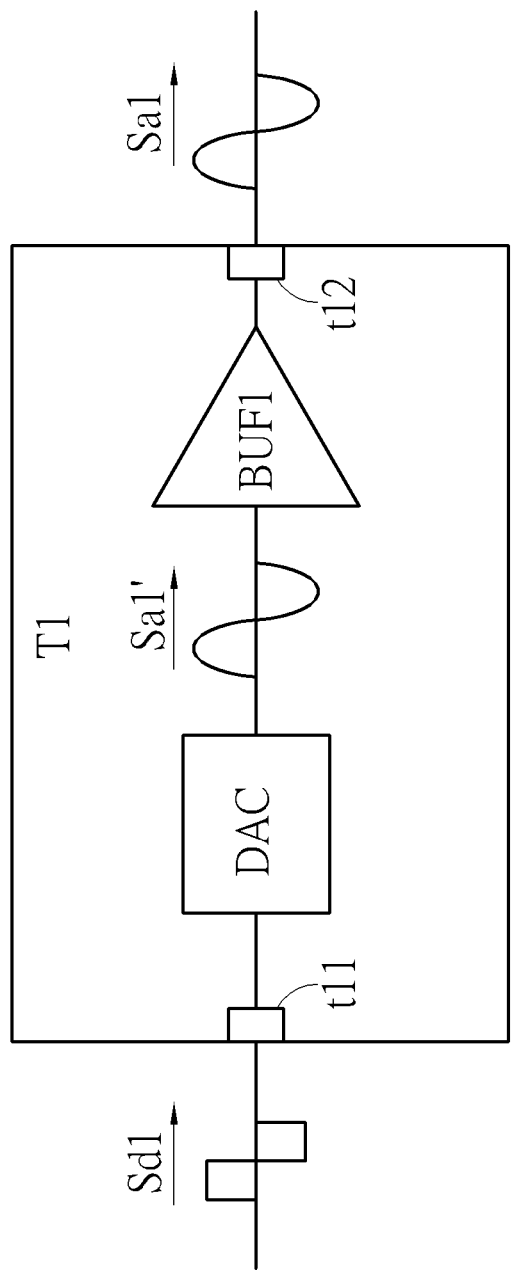
FIG. 4 illustrates a block diagram of the first conversion unit according to an embodiment of the present invention.

FIG. 4 illustrates a block diagram of the first conversion unit T1 according to an embodiment of the present invention. The first conversion unit T1 may include a digital-to-analog conversion unit DAC and a buffering unit BUF1. The digital-to-analog conversion unit DAC may include an input terminal coupled to the first terminal t11 of the first conversion unit T1, and an output terminal. The buffering unit BUF1 may include an input terminal coupled to the output terminal of the digital-to-analog conversion unit DAC, and an output terminal coupled to the second terminal t12 of the first conversion terminal unit T1. The digital-to-analog conversion unit DAC may be used to convert the first digital signal Sd1 to a first intermediary analog signal Sa1'. The buffering unit BUF1 may be used to perform amplification by using the first intermediary analog signal Sa1' to generate the first analog signal Sa1. The amplification may be an n-times amplification for improving stability of the first analog signal Sa1.

Figure 5:
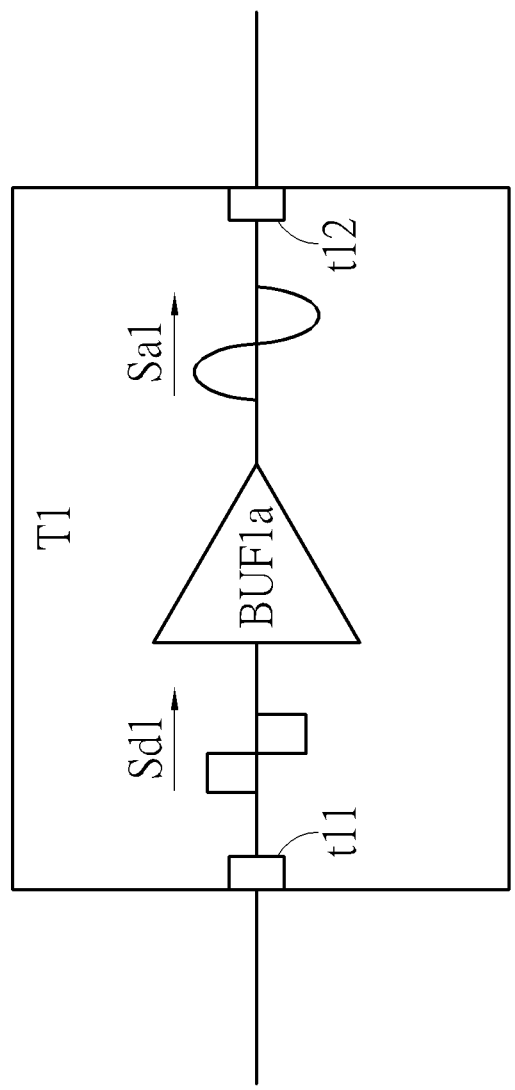
FIG. 5 illustrates a block diagram of the first conversion unit according to an embodiment of the present invention.

FIG. 5 illustrates a block diagram of the first conversion unit T1 according to an embodiment of the present invention. As shown in FIG. 5, the first conversion unit T1 may include a buffering unit BUF1a. The buffering unit BUF1a may include an input terminal coupled to the first terminal t11 of the first conversion unit T1, and an output terminal coupled to the second terminal t12 of the first conversion unit T1. The buffering unit BUF1a may be used to perform filtering and amplification by using the first digital signal Sd1 to generate the first analog signal Sa1.

Figure 6:
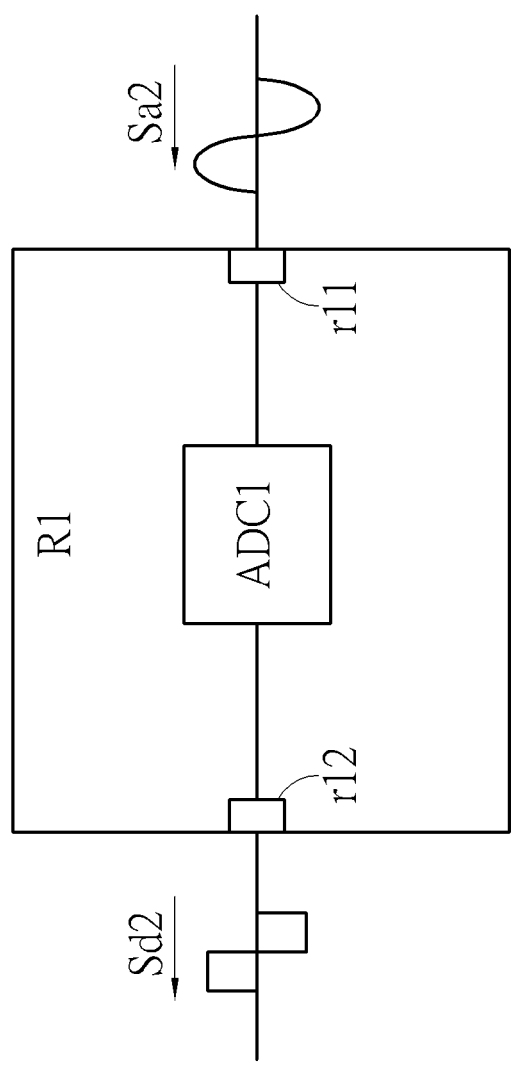
FIG. 6 illustrates a block diagram of the second conversion unit according to an embodiment of the present invention.

FIG. 6 illustrates a block diagram of the second conversion unit R1 according to an embodiment of the present invention. The second conversion unit R1 may include an analog-to-digital conversion unit ADC1. The analog-to-digital conversion unit ADC1 may include an input terminal coupled to the first terminal r11 of the second conversion unit R1, and an output terminal coupled to the second terminal r12 of the second conversion unit R1. The analog-to-digital conversion unit ADC1 may be used to convert the second analog signal Sa2 to the second digital signal Sd2.

Figure 7:
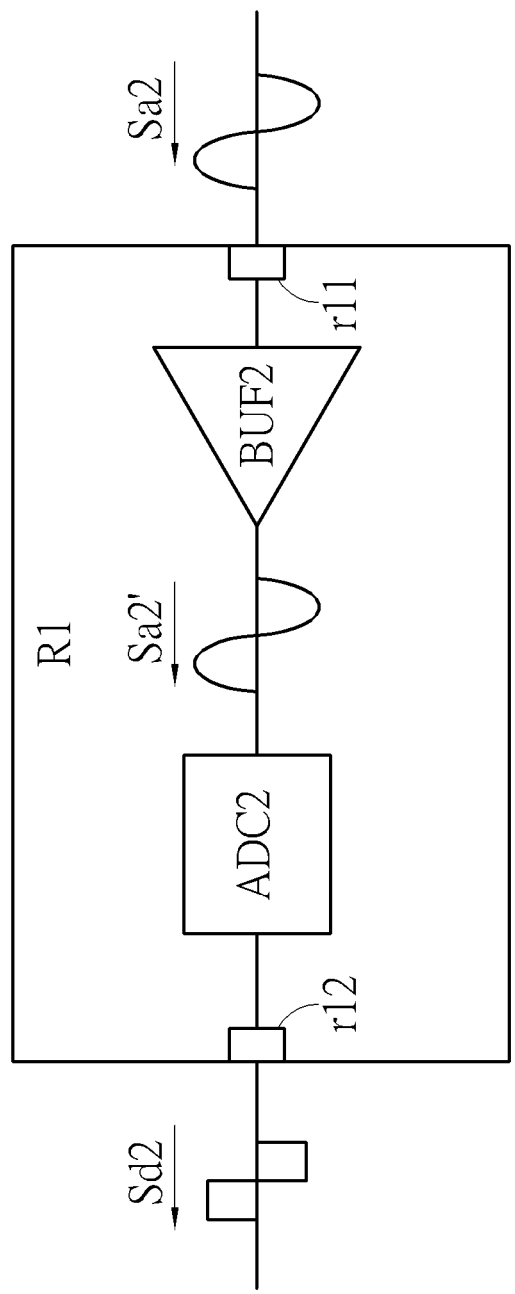
FIG. 7 illustrates a block diagram of the second conversion unit according to an embodiment of the present invention.

FIG. 7 illustrates a block diagram of the second conversion unit R1 according to an embodiment of the present invention. The second conversion unit R1 may include a buffering unit BUF2 and an analog-to-digital unit ADC2. The buffering unit BUF2 may include an input terminal coupled to the first terminal r11 of the second conversion unit R1, and an output terminal. The analog-to-digital unit ADC2 may include an input terminal coupled to the output terminal of the buffering unit BUF2, and an output terminal coupled to the second terminal r12. The buffering unit BUF2 may perform amplification by using the second analog signal Sa2 to generate a second intermediary analog signal Sa2'. The analog-to-digital conversion unit ADC2 may convert the second intermediary analog signal Sa2' to the second digital signal Sd2. The buffering unit BUF2 may be used to improve the stability of signals.

Figure 8:
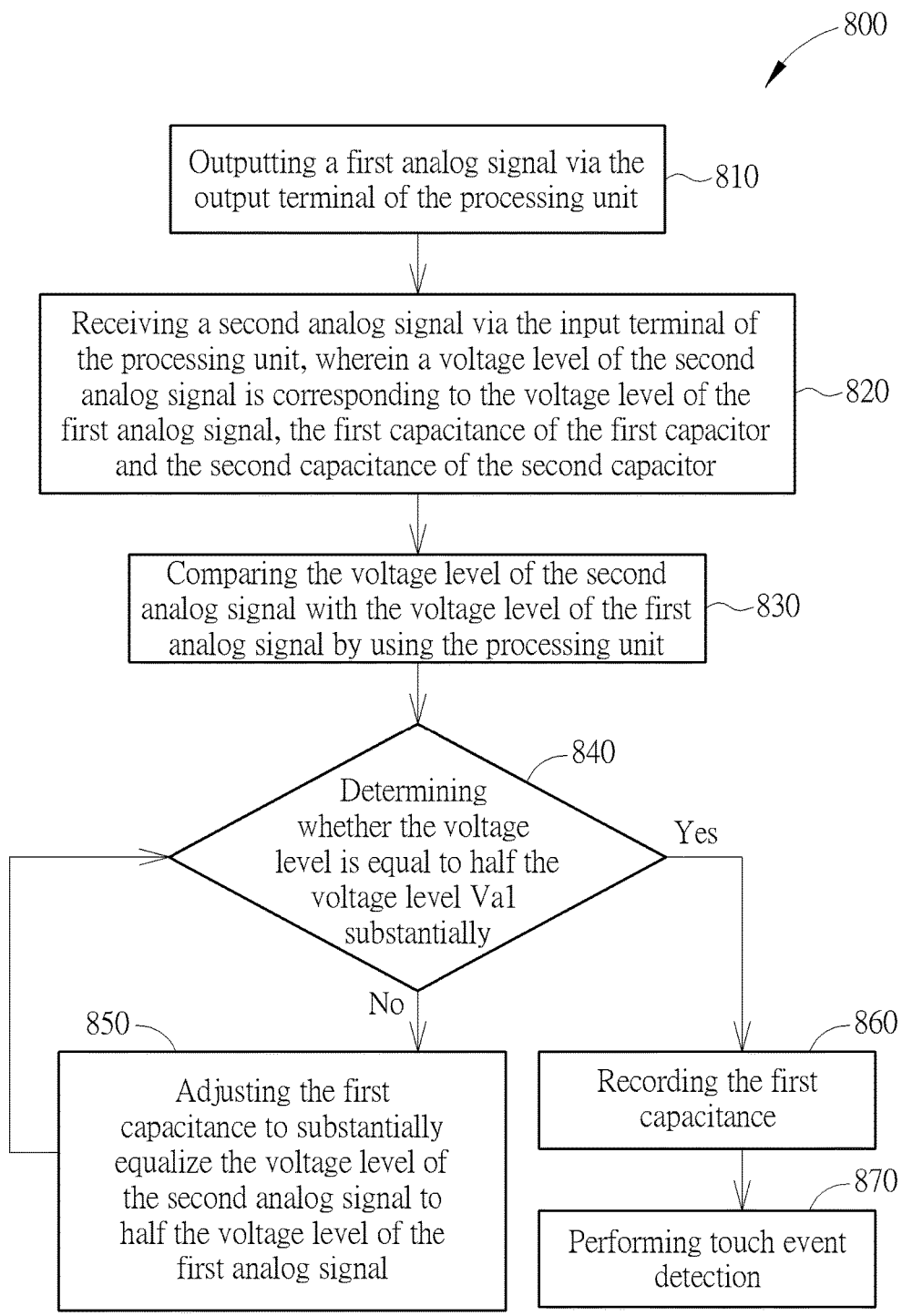
FIG. 8 illustrates a flowchart of a touch detection method according to an embodiment of the present invention.

FIG. 8 illustrates a flowchart of a touch detection method 800 according to an embodiment of the present invention. With reference to the touch detection device 100, the touch detection method 800 may include:

Step 810: outputting a first analog signal Sa1 via the output terminal 1101 of the processing unit 110;

Step 820: receiving a second analog signal Sa2 via the input terminal 1102 of the processing unit 110, wherein a voltage level Va2 of the second analog signal Sa2 is corresponding to the voltage level Va1 of the first analog signal Sa1, the first capacitance Cv1 of the first capacitor C1 and the second capacitance Cv2 of the second capacitor C2;

Step 830: comparing the voltage level Va2 of the second analog signal Sa2 with the voltage level Va1 of the first analog signal Sa1 by using the processing unit 100;

Step 840: determining whether the voltage level Va2 is equal to half the voltage level Va1 substantially; if so, performing step 860; else, performing step 850;

Step 850: adjusting the first capacitance Cv1 to substantially equalize the voltage level Va2 of the second analog signal Sa2 to half the voltage level Va1 of the first analog signal Sa1;

Step 860: recording the first capacitance Cv1; and

Step 870: performing touch event detection.

Figure 9:
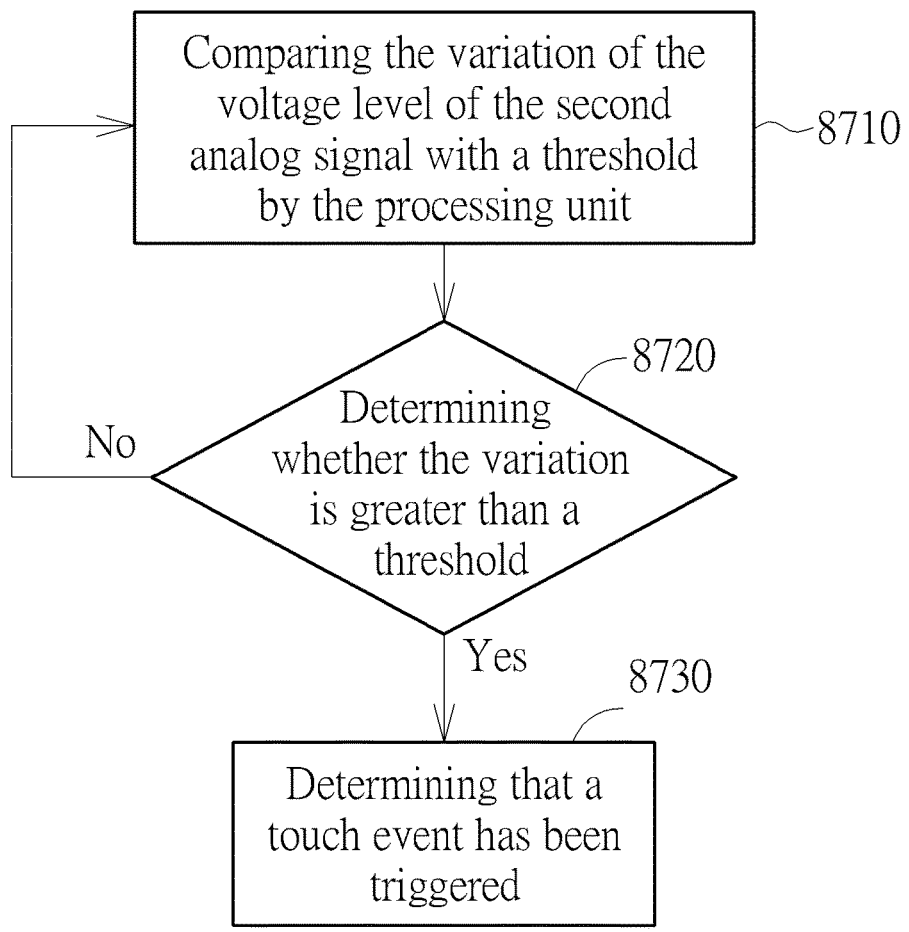
FIG. 9 illustrates a flowchart of a step of FIG. 8 according to an embodiment of the present invention.

FIG. 9 illustrates a flowchart of Step 870 of FIG. 8 according to an embodiment of the present invention. Referring to FIG. 1 and FIG. 2, Step 870 of the touch detection method 800 may include:

Step 8710: comparing the variation ΔVa2 of the voltage level Va2 of the second analog signal Sa2 with a threshold by the processing unit 100;

Step 8720: determining whether the variation ΔVa2 is greater than a threshold; if so, go to step 8730; else, go to step 8710; and Step 8730: determining that a touch event has been triggered.

Referring to FIGS. 1, 2, 8 and 9, steps 810 to 860 may be performed before the touch detection device 100 is touched by the external object. In other words, step 810 to 860 may be performed to calibrate the touch detection device 100. In steps 810 and 820, the relation among the voltage level Va1, the voltage level Va2, the first capacitance Cv1 and the second capacitance Cv2 may be described with the equation (eq-1):

$$Va2=Va1*[Cv1/(Cv1+Cv2)] \quad (\text{eq-1}).$$

In steps 8710 to 8730, the variation ΔVa2 of the voltage level Va2 is used to determine whether a touch event is triggered, a greater variation ΔVa2 is associated with a higher sensitivity of the detection. As shown in FIG. 2, when a touch event has been triggered, the external object Cx (having the third capacitance Cvx) may be considered to be in parallel with the second capacitor C2 substantially. Hence, the variation ΔVa2 may be a difference obtained by subtracting the voltage level Va2 measured after the touch event is triggered from the voltage level Va2 measured before the touch event is triggered as described by the equation (eq-2).

$$\begin{aligned}\Delta Va2 &= Va1*[Cv1/(Cv1+Cv2)] - Va1* \\ &\quad [Cv1/(Cv1+Cv2+Cvx)] \\ &= Va1*Cv1*Cvx/ \\ &\quad [(Cv1+Cv2)*(Cv1+Cv2+Cvx)]. \end{aligned} \quad (\text{eq}-2)$$

In order to obtain a maximum of the variation ΔVa2, a partial differential equation (eq-3) may be performed with an assumption that Cv1+Cv2≫Cvx.

$$\partial \Delta Va2/\partial Cv1 = Cvx*Va1*(Cv2^2-Cv1^2)/(Cv1+Cv2)^4 \quad (\text{eq-3}).$$

When the variation ΔVa2 is of a maximum, the result of ∂ΔVa2/∂Cv1 is 0. Hence, according to the equation (eq-1), when the touch event is not yet triggered with the external object Cx, the voltage level Va2 may be obtained with the equation (eq-4).

$$Va2=Va1*[Cv1/(Cv1+Cv2)]=0.5*Va1 \quad (\text{eq-4}).$$

Thus, by adjusting the first capacitance Cv1 of the first capacitor C1 to be equal to the second capacitance Cv2 of the second capacitor C2 substantially, the voltage level Va2 of the second analog signal Sa2 may be equal to half the voltage level Va1 of the first analog signal Sa1. After being calibrated in this way, the sensitivity of the detection may be optimized. Therefore, steps 810 to 850 may be performed for calibration, and the adjusted and calibrated first capacitance Cv1 may be stored in step 860 to be used afterward to avoid performing steps 810 to 850 repeatedly. However, step 860 may be skipped depending on the embodiment.

According to an embodiment of the present invention, when an approximate range of the second capacitance Cv2 of the second capacitor C2 (i.e. an equivalent capacitor from the touch panel to the ground) has been estimated, the first capacitance Cv1 may be set to be close to the second capacitance Cv2, and be fine-tuned by performing steps 830 to 850. The second capacitance Cv2 and/or the first capacitance Cv1 that has been adjusted previously may be affected by temperature or service life, so performing calibration and fine-tuning may improve the sensitivity of the detection device. According to an embodiment of the present invention, when approximate range of the second capacitance Cv2 is unknown, it is more helpful to improve the sensitivity of the touch detection device by performing abovementioned steps. In steps 830 to 850, a control unit including multiple bits may be used to adjust the first capacitance Cv1. According to an embodiment of the present invention, a bisection method may be used to adjust the first capacitance Cv1 to be equal to the second capacitance Cv2 substantially. As described above, when the first capacitance Cv1 equals the second capacitance Cv2 substantially, the signal-to-noise ratio (SNR) may be maximized when detecting a touch event. In step 8720, it may be set that a touch event is determined to be triggered when the variation ΔVa2 is greater than a threshold, and the threshold may be a predetermined value.

Figure 10:
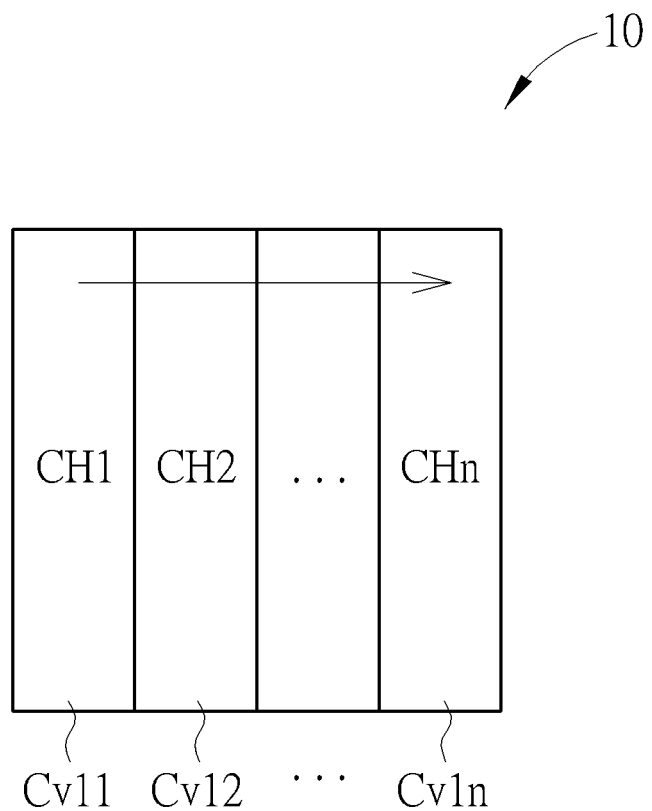
FIG. 10 illustrates that the steps may be performed corresponding to a plurality of channels according to an embodiment of the present invention.

FIG. 10 illustrates that the foresaid steps may be performed corresponding to channels CH1 to CHn according to an embodiment of the present invention. According to an embodiment of the present invention, the touch detection device 100 shown in FIG. 1 may be corresponding to a channel of a touch panel, and the touch panel may include a plurality of channels. For example, as shown in FIG. 10, a touch panel 10 may have n portions corresponding to the channels CH1 to CHn. Since the touch panel 10 includes n channels as shown in FIG. 10, the flow shown in FIG. 8 and FIG. 9 may be repeatedly performed to as to calibrate the channels CH1 to CHn. The calibrated first capacitances Cv11 to Cv1n may be stored for adjusting the first capacitor of each channel afterward for touch event detection.

In summary, the touch detection device and the touch detection method provided by embodiments of the present invention may adjust the first capacitance Cv1 shown in FIGS. 1 to 3 to be equal to the second capacitance Cv2 substantially so as to maximize the calculated SNR when detecting a touch event. In practice, the second capacitance Cv2 may be a known or unknown capacitance, and the device and the method may be used under each of the both conditions to obtain a maximized SNR. Since the second analog signal Sa2 used to determine whether the a touch event has been triggered may be an analog signal such as being in the form of sine wave, it is allowed to perform narrow-band filtering, so unwanted noise may be filtered away more efficiently. Comparing with prior art, the touch detection device and method may have a better anti-noise effect and lead to a largest signal variation when detecting a touch event so that the SNR is increased, and the sensitivity and accuracy of touch detection are improved. Thus, the present invention may be helpful in the field of touch detection.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch detection device comprising:
   a processing unit comprising an output terminal configured to output a first analog signal, and an input terminal configured to receive a second analog signal;
   a first capacitor having an adjustable first capacitance, and comprising a first terminal coupled to the output terminal of the processing unit, and a second terminal coupled to the input terminal of the processing unit; and
   a second capacitor having a second capacitance, and comprising a first terminal coupled to the input terminal of the processing unit, and a second terminal coupled to a ground terminal;
   wherein the first capacitance is adjusted so that the voltage level of the second analog signal is substantially equal to half a voltage level of the first analog signal, and the processing unit determines whether a touch event has been triggered according to a variation of a voltage level of the second analog signal.

2. The touch detection device of claim 1, wherein the touch event is triggered when an external object touches the touch detection device, the external object has a third capacitance, and the variation of the voltage level of the second analog signal is corresponding to the first capacitance, the second capacitance, the third capacitance and the voltage level of the first analog signal.

3. The touch detection device of claim 1, wherein the processing unit further comprises:
a first conversion unit configured to generate the first analog signal according to a first digital signal, and comprising a first terminal configured to receive the first digital signal, and a second terminal coupled to the output terminal of the processing unit and configured to output the first analog signal;
a second conversion unit configured to generate a second digital signal according to a second analog signal, and comprising a first terminal coupled to the input terminal of the processing unit and configured to receive the second analog signal, and a second terminal configured to output the second digital terminal; and
a digital control unit configured to generate the first digital signal, receive the second digital signal, and determine whether a touch event has been triggered according to the first digital signal and the second digital signal, the digital control unit comprising an output terminal coupled to the first terminal of the first conversion unit and configured to output the first digital signal, and an input terminal coupled to the second terminal of the second conversion unit and configured to receive the second digital signal.

4. The touch detection device of claim 3, wherein the second conversion unit further comprises:
an analog-to-digital conversion unit configured to convert the second analog signal to the second digital signal.

5. The touch detection device of claim 3, wherein the second conversion unit further comprises:
a second buffering unit configured to perform amplification by using the second analog signal to generate a second intermediary analog signal; and
an analog-to-digital unit coupled to the second buffering unit and configured to convert the second intermediary analog signal to the second digital signal.

6. The touch detection device of claim 3, wherein the first conversion unit further comprises:
a digital-to-analog conversion unit configured to convert the first digital signal to a first intermediary analog signal; and
a first buffering unit coupled to the digital-to-analog conversion unit and configured to perform amplification by using the first intermediary analog signal to generate the first analog signal.

7. The touch detection device of claim 6, wherein the second conversion unit further comprises:
an analog-to-digital conversion unit configured to convert the second analog signal to the second digital signal.

8. The touch detection device of claim 6, wherein the second conversion unit further comprises:
a second buffering unit configured to perform amplification by using the second analog signal to generate a second intermediary analog signal; and
an analog-to-digital conversion unit coupled to the second buffering unit and configured to convert the second intermediary analog signal to the second digital signal.

9. The touch detection device of claim 3, wherein the first conversion unit further comprises:
a first buffering unit configured to perform filtering and amplification by using the first digital signal to generate the first analog signal.

10. The touch detection device of claim 9, wherein the second conversion unit further comprises:
an analog-to-digital conversion unit configured to convert the second analog signal to the second digital signal.

11. The touch detection device of claim 9, wherein the second conversion unit further comprises:
a second buffering unit configured to perform amplification by using the second analog signal to generate a second intermediary analog signal; and
an analog-to-digital conversion unit coupled to the second buffering unit and configured to convert the second intermediary analog signal to the second digital signal.

12. A touch detection method of a touch detection device, the touch detection device comprising a processing unit, a first capacitor and a second capacitor, a first terminal of the first capacitor being coupled to an output terminal of the processing unit, a second terminal of the first capacitor being coupled to an input terminal of the processing unit and a first terminal of the second capacitor, a second terminal of the second capacitor being coupled to aground terminal, the touch detection method comprising:
outputting a first analog signal via the output terminal of the processing unit;
receiving a second analog signal via the input terminal of the processing unit, wherein a voltage level of the second analog signal is corresponding to a voltage level of the first analog signal, a first capacitance of the first capacitor and a second capacitance of the second capacitor;
comparing the voltage level of the second analog signal with the voltage level of the first analog signal by using the processing unit; and
adjusting the first capacitance to substantially equalize the voltage level of the second analog signal to half the voltage level of the first analog signal when the voltage level of the second analog signal fails to be substantially equal to half the voltage level of the first analog signal.

13. The touch detection method of claim 12 further comprising:
comparing a variation of the voltage level of the second analog signal with a threshold by the processing unit; and
determining a touch event has been triggered by the processing unit when the variation of the voltage level of the second analog signal is determined to be greater than the threshold.

14. The touch detection method of claim 13, wherein the touch event is triggered when an external object touches the touch detection device, the external object has a third capacitance, and the variation of the voltage level of the second analog signal is corresponding to the first capacitance, the second capacitance, the third capacitance and the voltage level of the first analog signal.

* * * * *